United States Patent [19]

Harder

[11] 4,378,638
[45] Apr. 5, 1983

[54] CHANGEABLE SURVEYORS ROD

[76] Inventor: Ernest H. Harder, Rte. 1, Whitewater, Kans. 67154

[21] Appl. No.: 254,159

[22] Filed: Apr. 14, 1981

[51] Int. Cl.³ .............................................. G01C 15/06
[52] U.S. Cl. ...................................................... 33/293
[58] Field of Search ................................. 33/293–297, 33/161, 125 R, 483, 484, 485, 486, 491, 173, 494, 404, 406, 407

[56] References Cited

U.S. PATENT DOCUMENTS 1,728,893  9/1929  Langsner ................................ 33/293
2,221,229  11/1940  Cain et al. .............................. 33/293 X
2,616,181  11/1952  Van Doorne ........................... 33/484
4,060,909  12/1977  Collins et al. ........................... 33/296

FOREIGN PATENT DOCUMENTS 40264  9/1957  Poland .................................... 33/293

Primary Examiner—Harry N. Haroian
Attorney, Agent, or Firm—Harvey B. Jacobson

[57] ABSTRACT

A surveyor's rod includes the use of a removable measurement scale having different measurement breakdowns on its opposite sides, such as feet and quarter inches on one side and feet and tenths of inches on the other. A removable bracket permits a quick and efficient reversal of the scale depending upon the measurement delineation desired by a user.

8 Claims, 5 Drawing Figures

U.S. Patent      Apr. 5, 1983      4,378,638
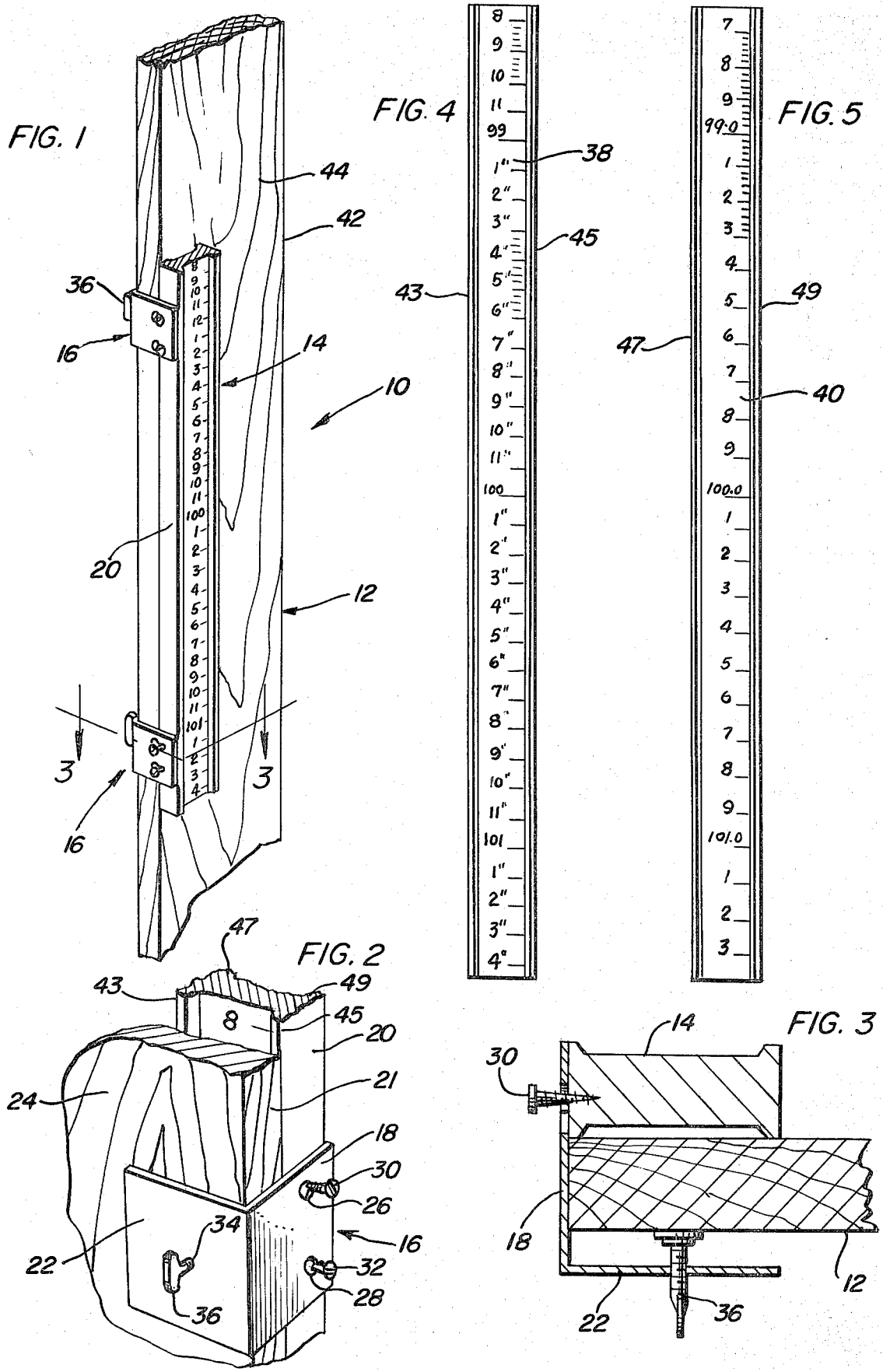

CHANGEABLE SURVEYORS ROD

BACKGROUND OF THE INVENTION

1. Field of the Invention

The present invention generally pertains to measuring devices and more particularly pertains to a surveyor's rod having a reversible measurement scale.

2. Description of the Prior Art

The use of surveyors' rods having more than a single measurement scale thereon is generally well known in the art. For example, U.S. Pat. No. 939,489, issued to Flanagan on Nov. 8, 1909, discloses a telemeter rod having three sets of graduations on its face. However, the Flanagan rod could create problems where a surveyor desires to utilize one measurement scale and mistakenly uses another positioned on the same rod. As such, it can be appreciated that there exists a need for a multiple scale serveyor's rod which would permit the elimination from the view of a user of any measurement scales not being utilized at a particular time. In this respect, the present invention substantially fulfils this need.

SUMMARY OF THE INVENTION

The general purpose of the present invention, which will be described subsequently in greater detail, is to provide a new and improved surveyor's rod having all of the advantages of the prior art surveyors' rods and none of the disadvantages. To attain this, the present invention provides for a surveyor's rod having a removable and reversible measurement scale whereby a surveyor may select one or the other of the scales for a particular use. Once a particular scale has been chosen, the other will be hidden from the surveyor's view due to the reversible construction thereof. Specifically, the reversible scale includes a pair of reversible clamps attached to an edge portion thereof, such clamps including the use of thumbscrews to effect an attachment of the measurement scale to the surveyor's rod in a desired position.

It is therefore an object of the present invention to provide a new and improved surveyor's rod that has all the advantages of similarly employed prior art surveyors' rods and none of the disadvantages.

It is another object of the present invention to provide a new and improved surveyor's rod which may be easily and economically manufactured.

It is a further object of the present invention to provide a new and improved surveyor's rod which is both simple in construction and limited in the number of moving parts.

Still another object of the present invention is to provide a new and improved surveyor's rod which may be efficiently and reliably employed in surveying operations.

Yet another object of the present invention is to provide a new and improved surveyor's rod which permits a surveyor to selectively choose a measurement scale.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the changeable surveyor's rod forming the present invention.

FIG. 2 is a detailed perspective view, partly in section, illustrating the construction of the clamping device forming a part of the present invention.

FIG. 3 is a transverse cross-sectional view illustrating further details of the clamping device taken along the line 3—3 of FIG. 1.

FIG. 4 is a plan view illustrating a first measurement scale as might be utilized on one side of the scale portion of the present invention.

FIG. 5 is a plan view illustrating a second measurement scale which might be utilized on the opposed side of the measurement scale employed in the present invention.

DESCRIPTION OF THE PREFERRED EMBODIMENT

With reference now to the drawings and in particular to FIG. 1 thereof, a changeable surveyor's rod embodying the principles and concepts of the present invention and generally designated by the reference numeral 10 will be described. In this respect, it can be seen that the improved surveyor's rod 10 includes a rod member or elongated pole 12, which would normally have a measurement scale integrally formed thereon, and a removable measurement scale 14 selectively attachable thereto through the use of one or more attachment clamps 16. In this connection then, it can be appreciated that the measurement scale 14 may be selectively positioned on the surveyor's pole 12 in a manner which facilitates an accurate visual observation thereof by a user.

FIGS. 2 and 3 serve to illustrate the preferred manner of attaching the measurement scale 14 to a surveyor's pole 12. In this regard, it can be seen that the attachment clamps 16 are formed from L-shaped plate members having a first side 18 designed for abutment with a first edge 20 of the measurement scale 14 and a first edge 21 of the pole 12, and a second side 22 being designed for parallel alignment with a backside 24 of the surveyor's pole 12. In this connection, the first side 18 may be provided with a pair of screw engaging slots 26, 28 whereby a pair of screws 30, 32 may be selectively directed therethrough to effect an attachment of the clamp 16 to the first edge 20 of the measurement scale 14. As shown, the screws 30, 32, which would typically be wood screws or the like, may be continuously retained in the edge portion 20 of the measurement scale 14 due to the fact that the slots 26, 28 are provided with a first diameter portion which permits the screw heads to be directed therethrough without interference, and a second diameter portion which may then be brought into engagement with the necks or threaded portions of the screws. This engagement of the slots 26, 28 with the respective threaded portions of the screws 30, 32 is accomplished by a transverse movement of the clamp 16 once the screw heads have been directed through the slots, and the screws may be then manually tightened, if desired, to effect a gripping action on the clamp 16 so as to securely attached the same to the measurement scale 14.

As further illustrated in FIGS. 2 and 3, the second side 22 of the attachment clamp 16 may be provided with a centrally positioned aperture 34 through which a thumbscrew 36 may be screwably inserted. As most clearly illustrated in FIG. 3, the thumbscrew 36 may be inserted through the aperture 34 until contact is made with the surveyor's pole 12. Inasmuch as the clamp 16 is already fixedly secured to the measurement scale 14 through the use of the aforedescribed screws 30, 32, the thumbscrew 36 effectively pulls the measurement scale 14 into a fixed and secure engagement with the surveyor's pole 12. Accordingly, it can be appreciated that through a loosening of the respective thumbscrews 36 associated with one or more attachment clamps 16, the measurement scale 14 may be positioned where desired along the surveyor's pole 12 and may then be fixedly attached thereto through a retightening of the thumbscrews.

FIGS. 4 and 5 have been provided to illustrate additional novel features associated with the present invention. In this respect, FIG. 4 represents a first measurement face 38 of the measurement scale 14 whereby the same might be calibrated in feet with specific measurement breakdowns in quarters of an inch, while FIG. 5 represents the opposed side or a measurement face 40 of the scale 14 whereby a measurement scale may be provided which is calibrated in feet with specific measurement breakdowns in tenths of a inch. Accordingly, the measurement scale 14 may be selectively provided with two different measurement scales 38, 40 by positioning such measurement breakdowns on opposed sides of the scale 14, thereby to provide a surveyor with the option of utilizing one or the other of the scales. Of course, it is to be understood that the specific calibration of the measurement faces 38, 40 may be broken down in any manner as desired and the same is considered to be a matter of design preference.

Inasmuch as one or the other of the measurement faces 38, 40 will always be visible to a surveyor while the remaining face will abut against a front surface 44 of the surveyor's pole 12, some means must be provided for selectively reversing the measurement faces whenever necessary. Such a reversal is facilitated by the construction of the attachment clamps 16, whereby it can be appreciated that through a loosening of the wood screws 30, 32, if necessary, along with a concurrent loosening of the thumbscrew 36, a user may quickly remove the clamp from engagement with the wood screws. By a simple reversal of the clamp then, i.e., where the second side 22 of the clamp 16 is now brought over in front of the opposed measurement face, the measurement scale 14 may be reversed on the surveyor's pole 12 in a manner which permits a viewing of the measurement face which was formerly in abutment with the surface 44 of the pole. In this regard, it can be seen that it would now be necessary to attach the measurement scale 14 to the opposed side edge 42 of the pole 12 once the clamps 16 have been reversed. To prevent the measurement faces 38, 40 from being damaged when in abutment with a surface of the surveyor's pole 12, the respective faces may be provided with longitudinally extending side ridges 43, 45 and 47, 49, as shown in FIG. 2. These ridges 43, 45 and 47, 49 serve to prevent the respective measurement faces 38, 40 from rubbing against a surface of the pole 12 which might result in some obliteration of the scales.

In use then, it can be seen that if a surveyor desires to use a first measurement face 38 associated with the measurement scale 14, he need only to attach one or more of the attachment clamps 16 thereto through a positioning of the slots 26, 28 over respective wood screws 30, 32 retained in a side edge 20 of the measurement scale. The clamps may then be securely attached to the measurement scale 14 by a tightening of the screws 30, 32 and the entire assembly may be brought into engagement with a surveyor's pole 12 in the manner illustrated in FIG. 2. Once the measurement scale 14 is positioned where desired relative to the surveyor's pole 12, the same may be securely affixed thereto by a tightening of thumbscrews 36 associated with the attachment clamps 16.

In the event that the surveyor wishes to use the opposed hidden measurement face 40 of the measurement scale 14, he need only to remove the measurement scale and associated clamps 16 from the surveyor's pole 12 through a loosening of the thumbscrews 36, and then through a loosening of the respective wood screws 30, 32, the clamps may be removed from the measurement scale. After such a removal of the attachment clamps 16, the surveyor need only to reverse the clamps by bringing the second side 22 of the clamps over in front of the formerly uncovered measurement face 38, and then again retighten the screws 30, 32 within their respective slots 28, 26 so as to securely attach the clamps thereto. The measurement scale 14 and clamp 16 assembly may then be brought back into operable engagement with the surveyor's pole 12 along the opposed side edge 42 thereof, and once positioned where desired, the assembly may be affixed securely thereto by a retightening of the thumbscrews 36.

As such, a new and improved surveyor's rod 10 has been described having a selectively removable measurement scale which permits a surveyor to adjust the height of the scale relative to a surveyor's pole, while at the same time permitting the surveyor to utilize different measurement scales not lying in a juxtaposed relationship, thereby eliminating the problem of concurrently visible scales causing confusion and mistake through an unintended reading of the wrong scale. With respect to the above description then, it should be realized that the optimum dimensional relationships for the parts of the invention are deemed readily apparent and obvious to one who is skilled in the art to which the invention pertains, and all equivalent relationships to those illustrated in the drawings and described in the specification, to include modification of form, size, arrangement of parts and details of operation, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A surveyor's measurement rod including upright pole support means, measurement scale means selectively attachable to said pole support means and including first and second calibrated measurement faces lying on opposite surfaces of said measurement scale means whereby one of said first and second faces will be in a hidden opposing relationship with a surface of said pole support means when the other of said first and second faces is visible to a user during a use of said surveyor's measurement rod, clamp means utilized to attach said measurement scale means to said pole support means, said clamp means being fixedly securable to said measurement scale means and reversible relative thereto so as to permit a reversing of said first and second faces as desired by a user, said clamp means being attachable to an edge portion of said measurement scale means so as not to interfere with a user's observation a particular calibrated measurement face being utilized, said clamp means being of an L-shaped configuration having first and second extending leg members, said first leg member being attachable to said edge portion of said measurement scale means and said second leg member extending along a back surface of said pole support means to facilitate an attachment of said measurement scale means to said pole support means.

2. The surveyor's measurement rod as defined in claim 1, wherein a thumbscrew means is provided in said second extending leg member so as to facilitate an attachment of said measurement scale means to said pole support means.

3. The surveyor's measurement rod as defined in claim 2, wherein said first extending leg member is provided with slots which facilitate an easy reversing of said clamp means with respect to said measurement scale means.

4. The surveyor's measurement rod as defined in claim 3, wherein said slots have a first diameter portion and a second diameter portion, said first diameter portion permitting a through movement of a head of an attachment screw means extending outwardly from said edge portion of said measurement scale means, said clamp means then being transversely movable to bring said second diameter portion into engagement with a threaded portion of said attachment screw means thus serving to support said clamp means in position on said measurement scale means when said thumbscrew means is brought into secure engagement with said pole support means.

5. The surveyor's measurement rod as defined in claim 4, wherein said attachment screw means may be tightened into a close abutting relationship with said clamp means thereby to further facilitate a supporting of said clamp means relative to said measurement scale means.

6. The surveyor's measurement rod as defined in claim 4, wherein ridges are provided on said first and second calibrated measurement faces to retain said faces in a spaced-apart relationship to said pole support means so as to prevent damage to said faces 7. The surveyor's measurement rod of claim 4 wherein said slots are horizontally disposed.

8. A surveyor's measurement rod including an upright having opposite side faces and opposite side edges, an elongated measurement scale member including opposite side faces and opposite side edges, said measurement scale member opposite side faces defining a first and second calibrated surfaces, L-shaped clamp means including first and second flanges disposed at substantially right angles relative to each other, one of said flanges including clamp screw means threadedly supported therefrom and disposed substantially normal thereto, said one flange overlying one face of said upright in spaced relation relative thereto with said clamp screw means engaging said upright one face, the other flange of said clamp means overlying one edge of said upright and projecting outwardly beyond the other face of said upright, said measurement scale member overlying said other upright face with one of said calibrated faces opposing said other upright face and one edge of said scale member opposing and abutted against said second flange of said clamp means, and attaching means reversably attaching said one edge of said measurement scale member to said second flange of said clamp means for reversable positioning of said measurement scale member relative to said upright other upright face and said clamp means second flange, whereby either of said calibrated faces will face outwardly of said second upright face and the other calibrated face will oppose said other upright face and thus be hidden from view.

* * * * *